United States Patent
Matsuno (10) Patent No.: US 10,454,127 B2
(45) Date of Patent: Oct. 22, 2019

(54) FUEL CELL MODULE

(71) Applicants: TOSHIBA ENERGY SYSTEMS & SOLUTIONS CORPORATION, Kawasaki-shi (JP); KABUSHIKI KAISHA TOSHIBA, Minato-ku (JP)

(72) Inventor: Takeshi Matsuno, Yokohama (JP)

(73) Assignees: TOSHIBA ENERGY SYSTEMS & SOLUTIONS CORPORATION, Kawasaki-shi (JP); KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/629,945

(22) Filed: Jun. 22, 2017

(65) Prior Publication Data

US 2018/0090779 A1 Mar. 29, 2018

(30) Foreign Application Priority Data

Sep. 28, 2016 (JP) .................................. 2016-190134
May 24, 2017 (JP) .................................. 2017-102853

(51) Int. Cl.
*H01M 8/248* (2016.01)
*H01M 8/2475* (2016.01)
(Continued)

(52) U.S. Cl.
CPC ............ *H01M 8/248* (2013.01); *H01M 2/22* (2013.01); *H01M 8/0206* (2013.01);
(Continued)

(58) Field of Classification Search
CPC ............ H01M 8/02; H01M 8/04; H01M 8/24; H01M 8/2475
See application file for complete search history.

(56) References Cited

U.S. PATENT DOCUMENTS 4,383,131 A * 5/1983 Clabburn ............... H02G 15/10
156/49
2006/0035128 A1* 2/2006 Draper .................... H01M 8/02
429/465

(Continued)

FOREIGN PATENT DOCUMENTS

JP 61-193376 A 8/1986
JP 5-74473 A 3/1993
(Continued)

OTHER PUBLICATIONS

Extended European Search Report dated Jan. 26, 2018 in European Patent Application No. 17177519.0, citing document AA, AB and AO therein, 7 pages.

(Continued)

*Primary Examiner* — Kenneth J Douyette
(74) *Attorney, Agent, or Firm* — Oblon, McClelland, Maier & Neustadt, L.L.P.

(57) ABSTRACT

A fuel cell module according to the present embodiment includes a cell stack, a package, bus bars, and electrically insulating members. The cell stack includes a plurality of fuel cells that are stacked, the fuel cells being configured to generate electric power using an oxygen-containing gas and a hydrogen-containing gas. The package houses the cell stack in a space surrounded by a package wall.

Each of the bus bars is a bus bar including one end electrically connected to an electrode terminal of the cell stack, and including another end positioned outside the package. The bus bars each include a spring mechanism between the one end and the other end and in the package. The electrically insulating members each enclose a gap between the bus bar and the package with the bus bar and the package electrically insulated from each other.

10 Claims, 5 Drawing Sheets

(51) Int. Cl.
  *H01M 8/04*      (2016.01)
  *H01M 8/04537*   (2016.01)
  *H01M 2/22*      (2006.01)
  *H01M 8/0206*    (2016.01)
  *H01M 8/124*     (2016.01)

(52) U.S. Cl.
  CPC ..... *H01M 8/04559* (2013.01); *H01M 8/2475* (2013.01); *H01M 2008/1293* (2013.01)

(56) References Cited

U.S. PATENT DOCUMENTS

| | | |
|---|---|---|
| 2008/0182151 A1 | 7/2008 | Mizusaki et al. |
| 2009/0104495 A1* | 4/2009 | Strutt ................. H01M 4/8605 429/411 |
| 2010/0040921 A1 | 2/2010 | Aoto et al. |
| 2016/0111733 A1* | 4/2016 | Shizuku ............. H01M 8/0247 429/452 |

FOREIGN PATENT DOCUMENTS

| | | |
|---|---|---|
| JP | 5-33466 U | 4/1993 |
| JP | 2008-147067 A | 6/2008 |
| JP | 2008-288051 A | 11/2008 |
| JP | 2012-99309 A | 5/2012 |
| JP | 2015-149294 A | 8/2015 |

OTHER PUBLICATIONS

Extended European Search Report dated Jan. 26, 2018 in European Patent Application No. 17177519.0, 7 pages.

* cited by examiner

FUEL CELL MODULE

CROSS-REFERENCE TO RELATED APPLICATIONS

This application is based upon and claims the benefit of priority from the prior Japanese Patent Application No. 2016-190134, filed on Sep. 28, 2016, and the prior Japanese Patent Application No. 2017-102853, filed on May 24, 2017 the entire contents of which are incorporated herein by reference.

FIELD

Embodiments of the present invention relate to a fuel cell module.

BACKGROUND

As a next-generation power generation system, a fuel cell module is known that generates electric power using a hydrogen-containing gas and an oxygen-containing gas. In the fuel cell module, a plurality of solid oxide fuel cells are stacked and housed in a package in the form of a cell stack. To electrode terminals of the cell stack, bus bars are electrically connected, the bus bars being current collecting structures, and through the bus bars, electric power generated by the cell stack is supplied to the outside of the package. In general, the solid oxide fuel cells are made of ceramics.

Gaps between the package and the bus bars are enclosed with electrically insulating members. If the enclosure by the electrically insulating members is insufficient, there is the risk that carbon monoxide (CO) gas and the like leak to the outside of the package. Therefore, to enclose the gaps between the package and the bus bars sufficiently, the bus bars are fixed to a package wall of the package. In addition, for the electrically insulating members, use is made of ceramics, which have a high electrical insulating performance even at high temperatures.

However, between the cell stack that operates at high temperatures and constituting members of the fuel cell module, there is a difference in thermal expansion. Therefore, thermal stresses act on the cell stack and the electrically insulating members through the bus bars, causing the risk that the cell stack and the electrically insulating members are degraded. An objective to be achieved by the present invention is to provide a fuel cell module capable of reducing a degradation due to thermal stress.

DETAILED DESCRIPTION

A fuel cell module according to the present embodiment includes a cell stack, a package, bus bars, and electrically insulating members. The cell stack includes a plurality of fuel cells that are stacked, the fuel cells being configured to generate electric power using an oxygen-containing gas and a hydrogen-containing gas. The package houses the cell stack in a space surrounded by a package wall.

Each of the bus bars is a bus bar including one end electrically connected to an electrode terminal of the cell stack, and including another end positioned outside the package. The bus bars each include a spring mechanism between the one end and the other end and in the package. The electrically insulating members each enclose a gap between the bus bar and the package with the bus bar and the package electrically insulated from each other, and each fix the bus bar on the package wall.

Embodiments will now be explained with reference to the accompanying drawings.

Hereinafter, embodiments of the present invention will be explained with reference to the accompanying drawings. The embodiments are not intended to limit the present invention.

First Embodiment

In a fuel cell module according to a first embodiment, a spring mechanism included in a bus bar converts a thermal stress generated due to a difference in thermal expansion in the fuel cell module into a spring reaction force, whereby a degradation of the fuel cell module due to thermal stress is intended to be reduced. Explanation will be made below more in detail.

Figure 1:
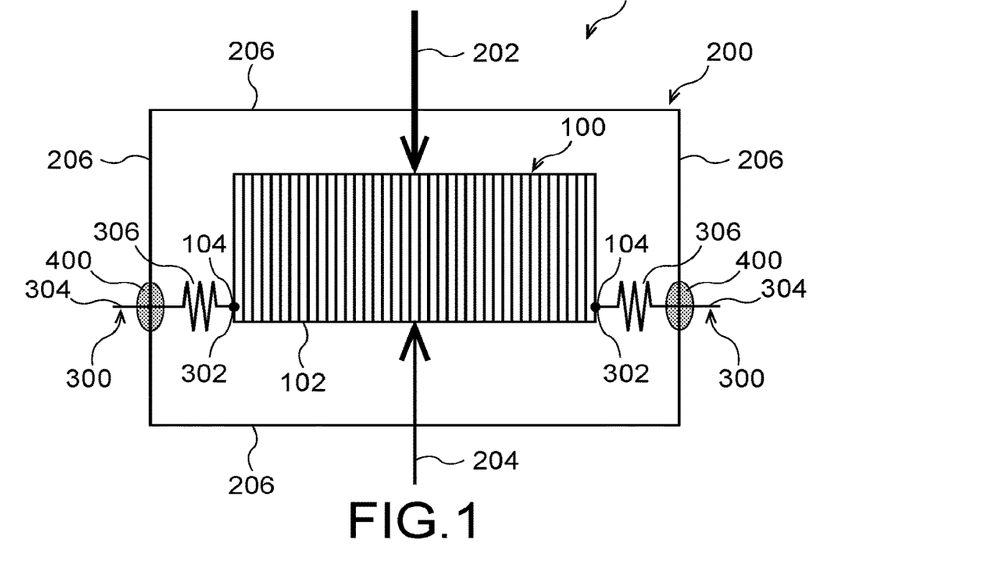
FIG. 1 is a diagram illustrating the configuration of a fuel cell module according to a first embodiment.

Based on FIG. 1, the configuration of a fuel cell module 1 according to the first embodiment will be explained. FIG. 1 is a diagram illustrating the configuration of the fuel cell module 1 according to the first embodiment. As illustrated in FIG. 1, the fuel cell module 1 generates electric power using a hydrogen-containing gas and an oxygen-containing gas (air). More specifically, the fuel cell module 1 includes a cell stack 100, a package 200, bus bars 300, and electrically insulating members 400.

The cell stack 100 is constituted by stacking a plurality of fuel cells 102 that are configured to generate electric power using a hydrogen-containing gas and an oxygen-containing gas. At both ends of the cell stack 100, electrode terminals 104 are disposed, the electrode terminals 104 being configured to supply current generated through the electric power generation by the fuel cells 102 to an outside.

The fuel cells 102 are, for example, solid oxide fuel cells and are configured to generate electric power through an electrochemical reaction using an electrolyte that mainly transmits oxide ions ($O_2^-$). More specifically, to an anode side of each solid oxide fuel cell, a hydrogen-containing gas is supplied as fuel gas, and to a cathode side of the solid oxide fuel cell, an oxygen-containing gas is supplied as oxidant. With this configuration, the solid oxide fuel cells generate electric power by the reaction expressed by Chemical Formula 1 below. To increase the conductivity of oxide ions, the solid oxide fuel cells operate at a high temperature of 600° C. to 1000° C. This increases an electrode reaction in speed, and use is not necessarily made of a noble metal as an electrode material of the solid oxide fuel cells.

In general, with an increase in temperature, the cell voltage of the solid oxide fuel cell with respect to the current density of the solid oxide fuel cell increases, enhancing an electric power generating performance. Meanwhile, solid oxide fuel cells are made of ceramics. The ceramics in some cases have a coefficient of thermal expansion that is as high as that of a ferrite-based steel special use stainless (SUS) material, at a high temperature of 600° C. to 1000° C.

Fuel-electrode reaction: $H_2 + O^{2-} \rightarrow 2H^+ + 2e^-$
$CO + O^{2-} \rightarrow CO_2 + 2e^-$ (Chemical Formula 1)

Oxidant electrode reaction: $O_2 + 4e^- \rightarrow 2O^{2-}$

The package 200 houses the cell stack 100. To the package 200, a hydrogen-containing gas supplying pipe 202 that supplies the hydrogen-containing gas to the cell stack 100, and an oxygen-containing gas supplying pipe 204 that supplies the oxygen-containing gas to the cell stack 100 are connected. In addition, the package 200 is constituted by a package wall 206, and in a space surrounded by the package wall 206, the cell stack 100 is housed. The package wall 206 can reach a high temperature of 100 to 600° C. and thus is made of, for example, a SUS material which is good in oxidation resistance.

If the hydrogen-containing gas or the oxygen-containing gas leaks from the package 200, the performance of the fuel cell module 1 may deteriorate. If an inflammable gas or carbon monoxide (CO) gas contained in the hydrogen-containing gas leaks, the gas may have a deleterious effect. For this reason, the package 200 is sealed (made airtight).

The bus bars 300 each include one end 302 that is electrically connected to the electrode terminal 104 of the cell stack 100, and another end 304 that is disposed outside the package 200 through a through hole in the package wall 206 of the package 200. In this manner, the bus bars 300 are connected to the electrode terminals 104 disposed at both ends of the cell stack 100, collect current generated by the electric power generation of the fuel cells 102, and supply the current to the outside. The bus bars 300 are made of, for example, a SUS material which has an oxidation resistance at high temperatures. As this SUS material, use is made of ferrite-based SUS430, ZMG, and the like which have low coefficients of thermal expansion and are hard to cause a thermal stress with an insulating material due to a difference in thermal expansion.

In addition, the bus bars 300 each include a spring mechanism 306 in the package 200. As illustrated in FIG. 1, the bus bars 300 are each configured such that, for example, a projecting direction of the bus bar 300 and an expanding direction of the spring mechanism 306 match with a stacking direction of the cells. That is, the expanding direction of the spring mechanism 306 is a direction that connects the one end 302 and the other end 304 of the bus bar. The configuration of the spring mechanism 306 will be explained later in detail.

The electrically insulating members 400 each enclose a gap between the package 200 and the bus bar 300 with the package 200 and the bus bar 300 electrically insulated from each other, and each fix the bus bar 300 on the package wall 206 of the package 200. A material of the electrically insulating members 400 is a ceramic such as glass, alumina, silica, and zirconia, and silicone, which are heat resistant.

Figure 2:
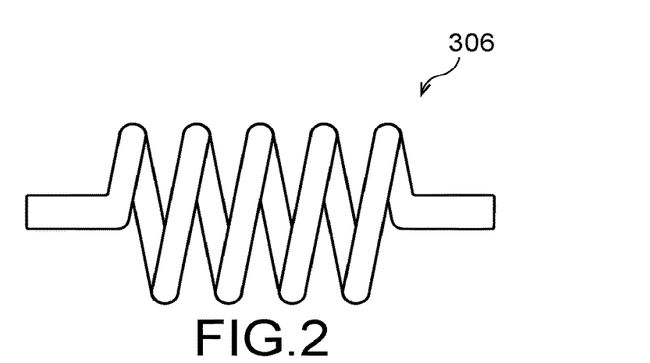
FIG. 2 is a diagram illustrating a helical spring.
Figure 3:
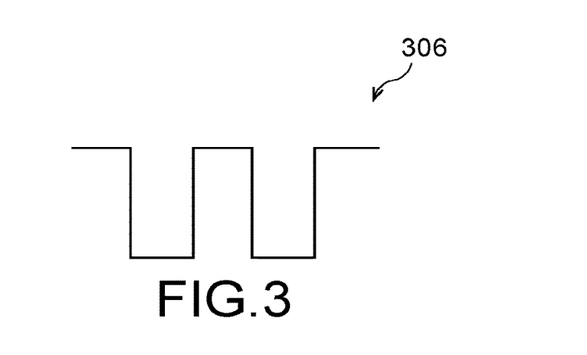
FIG. 3 is a diagram illustrating a spring mechanism that includes two U-shaped portions.
Figure 4:
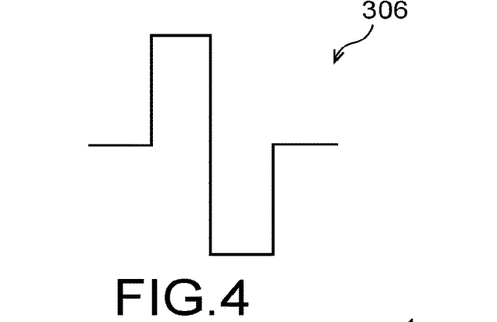
FIG. 4 is a diagram illustrating the spring mechanism that includes U-shaped portions in its upper and lower portions.

Based on FIG. 2 to FIG. 4, the configuration of the spring mechanism 306 will be explained in detail. FIG. 2 is a diagram illustrating a helical spring. FIG. 3 is a diagram illustrating the spring mechanism 306 that includes two U-shaped portions. FIG. 4 is a diagram illustrating the spring mechanism 306 that includes U-shaped portions in its upper and lower portions.

As illustrated in FIG. 2 to FIG. 4, the spring mechanism 306 uses restoring force of a metal elastic body, that is, restoring force of a spring. As illustrated in FIG. 2, the spring mechanism 306 is constituted by a helical spring, that is, a spirally formed metal spring. Alternatively, as illustrated FIG. 3 and FIG. 4, the spring mechanism 306 is constituted by a spring that is made by folding a metal piece a plurality of times.

(Action)

Since the cell stack 100 is positioned in the middle position of the package 200, the cell stack 100 reaches the highest temperature in the fuel cell module 1 when generating electric power. Meanwhile, since the package 200 is positioned the closest to outside air in the fuel cell module 1, the package 200 reaches a relatively low temperature. Therefore, between the cell stack 100 and the package 200, a difference in thermal expansion due to a difference in temperature is produced. Even if, as a material of the package 200, use is made of an austenitic material which has a larger coefficient of thermal expansion of SUS materials, the difference in thermal expansion inevitably occurs. In addition, the bus bars 300 also exhibit thermal expansion. The spring mechanisms 306 of the bus bars 300 absorb the composition of the differences in thermal expansion, by virtue of their elasticities. In other words, the spring mechanisms 306 of the bus bars 300 convert a thermal stress generated by the difference in thermal expansion into a resilient force of the springs that is weaker than the thermal stress.

The electrode terminal 104 and the bus bar 300 may be integrally formed. In this case, the integrally formed electrode terminal 104 and bus bar 300 are called an electrode terminal in some cases.

(Effect)

In the fuel cell module 1 according to the first embodiment, the bus bars 300 each include the spring mechanism 306 in the package 200. This configuration enables the spring mechanisms 306 of the bus bars 300 to convert a thermal stress generated by a difference in thermal expansion into a spring reaction force. Since the spring reaction force is weaker than the thermal stress, the thermal stress acting on the cell stack 100 is weaker than a thermal stress in the case where both ends of each bus bar 300 are fixed without the spring mechanism 306 interposed therebetween. This inhibits a breakage or the like of the cell stack 100, which makes it possible to reduce a degradation of the cell stack 100 due to thermal stress.

In addition, thermal stresses acting on the electrically insulating members 400 interposed between the package 200 and the bus bars 300 are also converted into spring reaction forces of the spring mechanisms 306 weaker than the thermal stresses, which makes it possible to reduce a degradation of the electrically insulating members 400 due to thermal stress.

Second Embodiment

In a fuel cell module according to a second embodiment, a spring in the spring mechanism having an tapered U-like shape in which a gap of an opened portion gradually narrows converts a thermal stress generated by a difference in thermal expansion in the fuel cell module into a spring reaction force that is weaker than the thermal stress, whereby a degradation of the fuel cell module due to thermal stress is intended to be reduced. Explanation will be made below more in detail.

Figure 5:
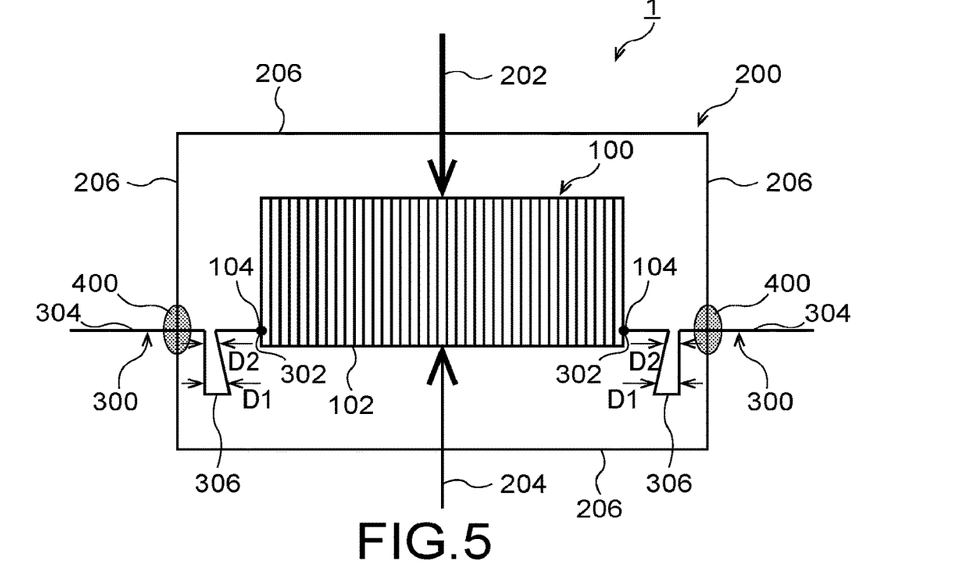
FIG. 5 is a diagram illustrating the configuration of a fuel cell module according to a second embodiment.

FIG. 5 is a diagram illustrating the configuration of a fuel cell module 1 according to the second embodiment. Based on FIG. 5, the configuration of the fuel cell module 1 according to the second embodiment will be explained. The configurations of spring mechanisms 306 in the fuel cell module 1 according to the second embodiment differ from the configurations of the spring mechanisms 306 in the fuel cell module 1 according to the first embodiment. Points of difference from the fuel cell module 1 according to the first embodiment will be explained, and the same configurations as those of the fuel cell module 1 according to the first embodiment are denoted by the same reference numbers, and the explanation thereof will not be made.

As illustrated in FIG. 5, the spring mechanisms 306 are each constituted by a spring having a U-like shape. This U-like shape is tapered in such a manner that a gap in the opened portion of the U-like shape gradually narrows. That is, a gap between a plate-like material forming the U-like shape of the U-like-shaped spring decreases from an interval D1 on its lower side to a gap D2 on its upper side. A spring reaction force of the U-shaped spring having a tapered gap is weaker than a spring reaction force of a U-shaped spring not having a tapered gap.

(Action)

The spring having a tapered U-like shape can convert the thermal stress into a spring reaction force that is weaker than in the case of a non-tapered U-like shape spring. Therefore, the difference in thermal expansion generated between a package 200 and a cell stack 100 can be absorbed as a weaker spring reaction force. The spring having a tapered U-like shape allows the use of a plate-like material that is inexpensively available, and allows easy machining. Therefore, production costs can also be suppressed.

(Effect)

In the fuel cell module 1 according to the second embodiment, a tapered U-like shape spring in which a gap of the opened portion gradually narrows is used in each of the spring mechanisms 306. With this configuration, it is possible to convert a thermal stress into a spring reaction force that is weaker than the thermal stress. Therefore, thermal stresses on the cell stack 100 and the insulating material are weaker than thermal stresses in the case of using a non-tapered U-like shape spring, and thus it is possible to reduce degradations of the cell stack 100 and the insulating material due to thermal stress. In addition, the tapered U-like shape spring has a shape that is easy to machine, and use can be made of a plate-like material that is inexpensively available.

Third Embodiment

In a fuel cell module according to a third embodiment, a wedge is disposed in a gap between a guide hole portion of a first electrically insulating member and the bus bar, and thermal fluctuations between the first electrically insulating member in contact with the bus bar and a second electrically insulating member in contact with the bus bar are suppressed, whereby a degradation of the fuel cell module due to thermal stress is intended to be reduced. Explanation will be made below more in detail.

Figure 6:
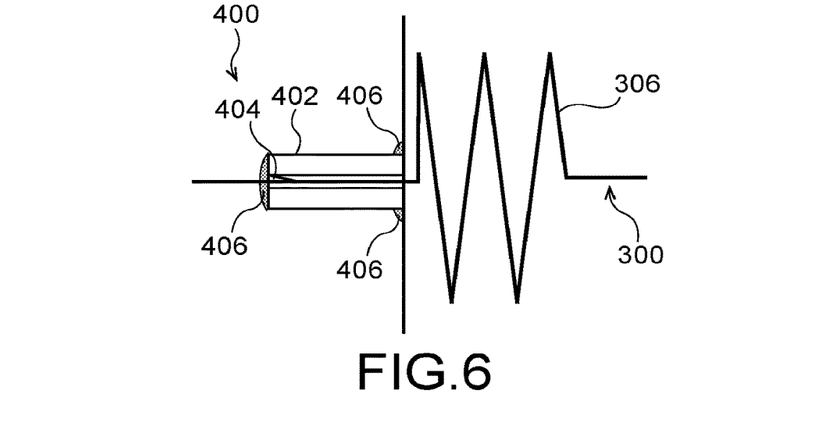
FIG. 6 is a cross-sectional schematic diagram illustrating the configuration of a fuel cell module according to a third embodiment.

FIG. 6 is a cross-sectional schematic diagram illustrating the configuration of a fuel cell module 1 according to the third embodiment. Based on FIG. 6, the configuration of the fuel cell module 1 according to the third embodiment will be explained. The configuration of an electrically insulating member 400 in the fuel cell module 1 according to the third embodiment differs from the configuration of the electrically insulating member 400 in the fuel cell module 1 according to the first embodiment. Points of difference from the fuel cell module 1 according to the first embodiment will be explained, and the same configurations as those of the fuel cell module 1 according to the first embodiment are denoted by the same reference numbers, and the explanation thereof will not be made.

As illustrated in FIG. 6, the electrically insulating member 400 encloses a gap between a package 200 and a bus bar 300 with the package 200 and the bus bar 300 electrically insulated from each other, and fixes the bus bar 300 on a package wall 206 of the package 200. In other words, the electrically insulating members 400 each include a first electrically insulating member 402, a wedge 404, and second electrically insulating members 406.

The first electrically insulating member 402 has a column-like shape and includes therein a guide hole portion through which the bus bar 300 is inserted. The first electrically insulating member 402 is, for example, an electrical insulator. A material of the first electrically insulating member 402 is a ceramic such as glass, alumina, silica, and zirconia, and silicone, which are heat resistant.

The wedge 404 has a shape that includes one end portion being made thick and grows thinner as extending toward the other end portion. The wedge 404 is constituted by, for example, a triangular metal piece. The wedge 404 is disposed in a gap between the guide hole portion of the first electrically insulating member 402 and the bus bars 300.

The second electrically insulating members 406 seal a gap between the first electrically insulating member 402 and the bus bars 300, and a gap between the first electrically insulating member 402 and the package 200. The second electrically insulating members 406 are each, for example, a sealant. Even without the wedge 404, the inclusion of the second electrically insulating members 406 allows the fuel cell module 1 to have the same sealing property and insulation property in the case where the wedge 404 is present.

Figure 7:
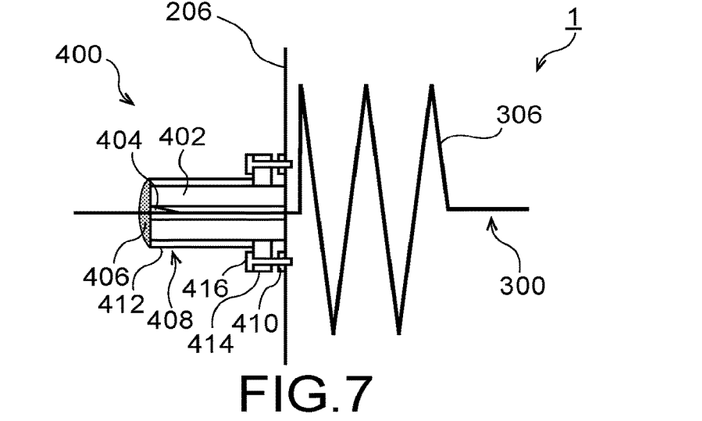
FIG. 7 is a cross-sectional schematic diagram of an electrically insulating member that further includes a flange portion.

Based on FIG. 7, explanation will be made about an example of the electrically insulating member 400 that further includes a flange portion 408. FIG. 7 is a cross-sectional schematic diagram illustrating a configuration example of the electrically insulating member 400 that further includes the flange portion 408. As illustrated in FIG. 7, the electrically insulating member 400 includes the first electrically insulating member 402, the wedge 404, the second electrically insulating member 406, the flange portion 408, and a third electrically insulating member 410. The same configurations as those in the electrically insulating member 400 illustrated in FIG. 6 are denoted by the same reference numbers, and the explanation thereof will not be made.

The flange portion 408 includes a cylinder 412 and a disc 414. The cylinder 412 and the disc 414 are connected to each other by circumferential welding to be fixedly sealed. The cylinder 412 and the disc 414 may be molded in the form of one component without the welding, so as to cut costs. In the cylinder 412, the first electrically insulating member 402 is built. The disc 414 is screwed to the package wall 206 of the package 200 with a screw 416.

The third electrically insulating member 410 is disposed between the disc 414 having a flange-like shape and the package wall 206 of the package 200. The third electrically insulating member 410 is, for example, a sealant. As illustrated in FIG. 7, the disc 414 having a flange-like shape is screwed to the package wall 206 of the package 200, whereby a gap between the flange-like shape and the package 200 is made airtight with third electrically insulating member 410.

Figure 8:
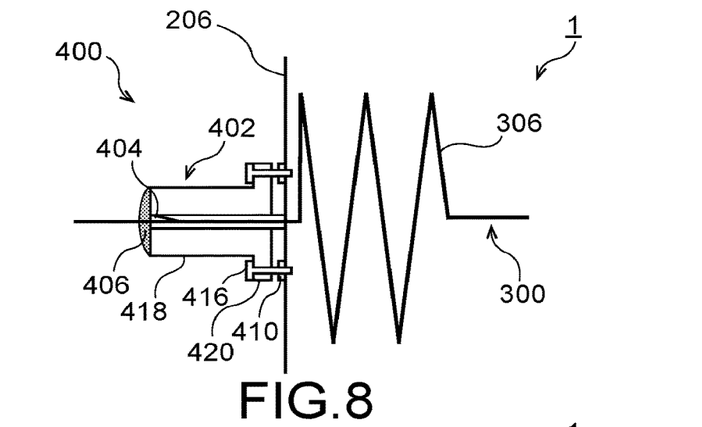
FIG. 8 is a cross-sectional schematic diagram illustrating an example of the electrically insulating member in which a first electrically insulating member further includes a disc.

FIG. 8 is a cross-sectional schematic diagram illustrating an example in which the first electrically insulating member 402 further includes a disc 420. Based on FIG. 8, explanation will be made about an example of the first electrically insulating member 402 that further includes the disc 420.

As illustrated in FIG. 8, the electrically insulating member 400 includes the first electrically insulating member 402, the wedge 404, the second electrically insulating member 406, and the third electrically insulating member 410. The same configurations as those in the electrically insulating member 400 illustrated in FIG. 6 are denoted by the same reference numbers, and the explanation thereof will not be made.

The first electrically insulating member 402 includes a column-like shape portion 418 and the disc 420. The column-like shape portion 418 includes therein a guide hole portion through which the bus bar 300 is inserted. The disc 420 is screwed to the package wall 206 of the package 200.

The third electrically insulating member 410 is disposed between the disc 420 of the first electrically insulating member 402 and the package wall 206 of the package 200. As seen from this configuration, by screwing the disc 420 of the first electrically insulating member 402 to the package wall 206 of the package 200, a gap between the first electrically insulating member 402 and the package 200 is made airtight with the third electrically insulating member 410.

(Action)

The wedge 404 is driven into a gap between the guide hole portion of the first electrically insulating member 402 and the bus bar 300. With this configuration, the wedge 404 makes the joining between the guide hole portion of the first electrically insulating member 402 and the bus bar 300 firm. In such a manner, the fixation between the electrically insulating member 400 and the bus bar 300 is made strong, and fluctuations between the first electrically insulating member 402 in contact with the bus bar 300 and the second electrically insulating member 406 in contact with the bus bar 300 are suppressed. In this case, the bus bar 300 expands and contracts to absorb a difference in thermal expansion in the fuel cell module 1.

(Effect)

In the fuel cell module 1 according to the third embodiment, the wedge 404 is disposed in the gap between the guide hole portion of the first electrically insulating member 402 and the bus bar 300. With this configuration, the fixation between the electrically insulating member 400 and the bus bar 300 is made stronger. Therefore, fluctuations between the first electrically insulating member 402 in contact with the bus bar 300 and the second electrically insulating member 406 in contact with the bus bar 300 are suppressed, whereby a degradation of the second electrically insulating member 406 can be reduced.

Fourth Embodiment

In a fuel cell module according to a fourth embodiment, the coefficient of thermal expansion of an outer bus bar is made closer to the coefficient of thermal expansion of the electrically insulating member, and a thermal stress generated between the outer bus bar and the electrically insulating member is suppressed, whereby a degradation of the fuel cell module due to thermal stress is intended to be reduced.

Figure 9:
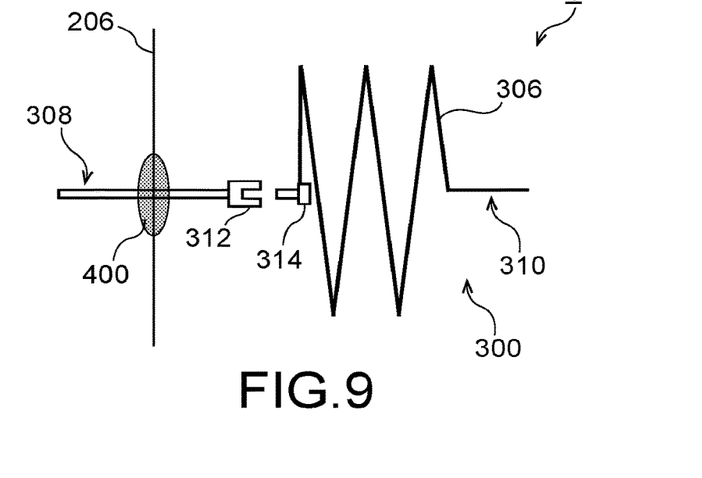
FIG. 9 is a diagram illustrating the configuration of a fuel cell module according to a fourth embodiment.

FIG. 9 is a diagram illustrating the configuration of a fuel cell module 1 according to the fourth embodiment. Based on FIG. 9, the configuration of the fuel cell module 1 according to the fourth embodiment will be explained. The configuration of a bus bar 300 in the fuel cell module 1 according to the fourth embodiment differs from the configuration of the bus bar 300 in the fuel cell module 1 according to the first embodiment. Points of difference from the fuel cell module 1 according to the first embodiment will be explained, and the same configurations as those of the fuel cell module 1 according to the first embodiment are denoted by the same reference characters, and the explanation thereof will not be made.

As illustrated in FIG. 9, the bus bar 300 includes an outer bus bar 308 and an inner bus bar 310. The outer bus bar 308 is fixed to the electrically insulating member 400 as being insulated from the package wall 206 of the package 200. The shape of a region of the outer bus bar 308 that is in contact with the insulating material is a column-like shape. In addition, the outer bus bar 308 is made of a material having a coefficient of thermal expansion that is equal to that of the electrically insulating member 400. This material is, for example, ferrite-based SUS430.

The inner bus bar 310 includes a spring mechanism 306 and is connected to an electrode terminal of a cell stack 100. The inner bus bar 310 is made of a material that has an oxidation resistance at high temperatures. This material is, for example, ZMG or the like, which is a SUS material. Therefore, the inner bus bar 310 has contact electric resistance and specific electric resistance with the cell stack 100 that are lower than those in the case of using ferrite-based SUS430 that constitutes the outer bus bar 308.

In addition, the inner bus bar 310 has a modulus of elasticity that is lower than that of the outer bus bar 308. In such a manner, the outer bus bar 308 and the inner bus bar 310 differ in material from each other.

One of the inner bus bar 310 and the outer bus bar 308 includes an internal thread feature 312, and the other includes an external thread feature 314. In addition, the internal thread feature 312 and the external thread feature 314 are electrically connected to each other. In the example illustrated in FIG. 9, the outer bus bar 308 includes the internal thread feature 312, and the inner bus bar 310 includes the external thread feature 314. Alternatively, the outer bus bar 308 may include the external thread feature 314, and the inner bus bar 310 may include the internal thread feature 312.

Figure 10:
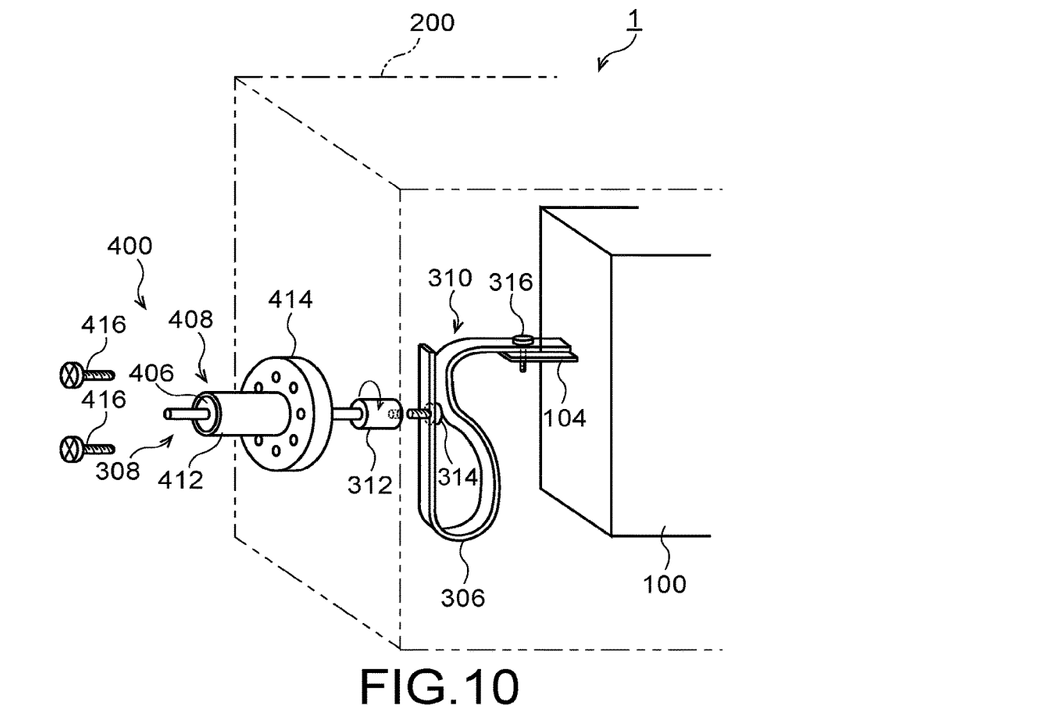
FIG. 10 is a diagram illustrating an example in which an inner bus bar has a tapered U-like shape spring.

FIG. 10 is a diagram illustrating an example in which the inner bus bar 310 includes a tapered U-like shape spring as a spring mechanism 306. Based on FIG. 10, explanation will be made about an example in which the inner bus bar 310 includes the tapered U-like shape spring. As illustrated in FIG. 10, the outer bus bar 308 includes the internal thread feature 312, and the inner bus bar 310 includes the external thread feature 314. The inner bus bar 310 includes the spring mechanism 306 that is constituted by the tapered U-like shape spring. In addition, the inner bus bar 310 is fixed to an electrode terminal 104 of the cell stack 100 with a screw 316.

The electrically insulating member 400 has the same configuration as that of the electrically insulating member 400 illustrated in FIG. 7.

(Action)

Here, explanation will be made about an example of a step of storing the cell stack 100 in the package 200. The inner bus bar 310 is fixed to the electrode terminal 104 of the cell stack 100, with the outer bus bar 308 and the inner bus bar 310 separated from each other. Then, the outer bus bar 308 is inserted into the electrically insulating member 400. Next, the cell stack 100 and the like are inserted in the package 200, and a lid is put on the package 200. Subsequently, the outer bus bar 308 and the inner bus bar 310 are electrically connected to each other.

As seen from the above, since the outer bus bar 308 and the inner bus bar 310 can be separated from each other, storing the cell stack 100 in the package 200 is performed more efficiently. In addition, for example, some material of the electrically insulating member 400 requires the electrically insulating member 400 to reach a high temperature of 500° C. or higher, otherwise a sealing function cannot be given between the outer bus bar 308 and the electrically insulating member 400. In this case, since the outer bus bar 308 and the inner bus bar 310 can be separated from each other, heat transferred to the outer bus bar 308 is not conducted to the inner bus bar 310 when the sealing function is given. This inhibits a thermal degradation of the cell stack 100.

The outer bus bar 308 is made of a material having a coefficient of thermal expansion that is equal to that of the electrically insulating member 400. Therefore, when reaching a high temperature, the outer bus bar 308 exhibits the same thermal expansion as that of the electrically insulating member 400. In addition, since the outer bus bar 308 has a shape of a round bar, that is, a column-like shape, the outer bus bar 308 transmits force generated between the outer bus bar 308 and the electrically insulating member 400 uniformly on a contact surface therebetween.

The inner bus bar 310 has contact electric resistance and specific electric resistance with the cell stack 100 that are lower than those in the case of using a material that constitutes the outer bus bar 308. Therefore, the inner bus bar 310 reduces a loss of electricity output more than the case of using the material that constitutes the outer bus bar 308. The tapered U-like shape spring converts a thermal stress into a spring resilient force that is weaker than the thermal stress. In addition, being plate-like, the U-like shape spring is formed by cutting out an inexpensive plate material.

(Effect)

In the fuel cell module 1 according to the fourth embodiment, the outer bus bar 308 and the inner bus bar 310 are made separable from each other and made to differ in material from each other. With this configuration, the coefficient of thermal expansion of the outer bus bar 308 can be brought even closer to the coefficient of thermal expansion of the electrically insulating member 400, while the conductivity of the inner bus bar 310 is kept. Therefore, it is possible to suppress a thermal stress generated between the outer bus bar 308 and the electrically insulating member 400 even more, and to reduce a degradation of the electrically insulating member 400. Therefore, even the repetition of thermal expansion and contraction occurs with stops of electric power generation, a degradation of the sealing function of the electrically insulating member 400 can be reduced.

In addition, with the coefficient of thermal expansion of the outer bus bar 308 kept, use can be made of a material of the inner bus bar 310 having a contact electric resistance and specific electric resistance with the electrode terminal 104 that are lower than those of the material of the outer bus bar 308. Therefore, it is possible to reduce a loss of electricity from the cell stack 100 through the inner bus bar 310 even more.

In addition, the outer bus bar 308 can be made to have a column-like shape, and the inner bus bar 310 can be made to have a plate-lake shape. With this configuration, a force generated between the outer bus bar 308 and the electrically insulating member 400 can be transmitted uniformly on the contact surface therebetween, which suppresses the occurrence of stress concentration more than a plate-like material. In addition, since the U-like shape spring in the spring mechanism 306 included in the inner bus bar 310 can be made plate-like, the U-like shape spring can be formed by cutting out an inexpensive plate material. Furthermore, since the U-like shape spring can convert a thermal stress into a spring resilient force that is weaker than the thermal stress, it is possible to reduce a degradation of the electrically insulating member 400 even when thermal expansion and contraction with stops of electric power generation are repeated many times.

Fifth Embodiment

In a fuel cell module according to a fifth embodiment, a spring mechanism included in a bus bar connected to a voltage terminal of a cell stack converts a thermal stress generated due to a difference in thermal expansion in the fuel cell module into a spring reaction force, whereby a degradation of the fuel cell module due to thermal stress is intended to be reduced. Explanation will be made below more in detail.

Figure 11:
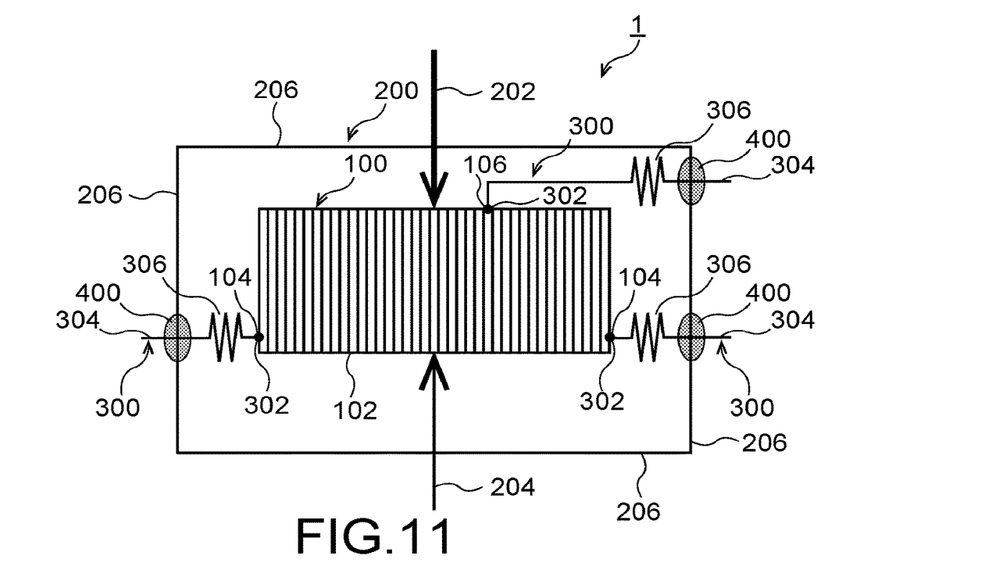
FIG. 11 is a diagram illustrating the configuration of a fuel cell module according to a fifth embodiment.

FIG. 11 is a diagram illustrating the configuration of a fuel cell module 1 according to a fifth embodiment. Based on FIG. 11, the configuration of the fuel cell module 1 according to the fifth embodiment will be explained. The fuel cell module 1 according to the fifth embodiment differs from the fuel cell module 1 according to the first embodiment in that a voltage terminal 106 for measuring voltage is provided on a stacking surface of a cell stack 100. Points of difference from the fuel cell module 1 according to the first embodiment will be explained, and the same configurations as those of the fuel cell module 1 according to the first embodiment are denoted by the same reference characters, and the explanation thereof will not be made.

As illustrated in FIG. 11, the cell stack 100 includes the voltage terminal 106 for measuring voltage, on its stacking surface. A bus bar 300 that is electrically connected to the voltage terminal 106 also has the same configuration as that of the bus bars 300 explained in the first to fourth embodiments. In addition, as illustrated in FIG. 11, a projecting direction of the bus bar 300 electrically connected to the voltage terminal 106 and an expanding direction of a spring mechanism 306 are the same as a stacking direction of cells.

The voltage terminal 106 and the bus bar 300 may be integrally formed. In this case, the integrally formed voltage terminal 106 and bus bar 300 are called a voltage terminal in some cases.

(Action)

A thermal expansion of the voltage terminal 106, a thermal expansion of the package 200, and a thermal expansion of the cell stack 100 are compounded to give rise to a difference in thermal expansion. In this case, the bus bar 300 connected to the voltage terminal 106 is longer than the other bus bars 300, and thus the difference in thermal expansion is larger than those in the case of the other bus bars 300. The difference in thermal expansion is absorbed by the spring mechanism 306 of the bus bar 300 connected to the voltage terminal 106.

(Effect)

In the fuel cell module 1 according to the fifth embodiment, the bus bar 300 connected to the voltage terminal 106 of the cell stack 100 includes the spring mechanism 306 in the package 200. With this configuration, the spring mechanism 306 of the bus bar 300 can convert a thermal stress due to a difference in thermal expansion into a spring reaction force that is weaker than the thermal stress. Therefore, the thermal stress acting on the cell stack 100 is weaker than a thermal stress in the case where both ends of the bus bar 300 are fixed without the spring mechanism 306 interposed therebetween. This inhibits a breakage or the like of the cell stack 100, which makes it possible to reduce a degradation of the cell stack 100 due to thermal stress.

In addition, a thermal stress acting on the electrically insulating member 400 interposed between the package 200 and the bus bar 300 is also converted into a spring reaction force of the spring mechanism 306 weaker than the thermal stress, which makes it possible to reduce a degradation of the electrically insulating member 400 due to thermal stress.

Sixth Embodiment

In a fuel cell module according to a sixth embodiment, a first electrically insulating member to which an outer bus bar is fixed is provided in the form of a loose flange, whereby a rotational strain between the outer bus bar and an inner bus bar is intended to be reduced. Explanation will be made below more in detail.

Figure 12:
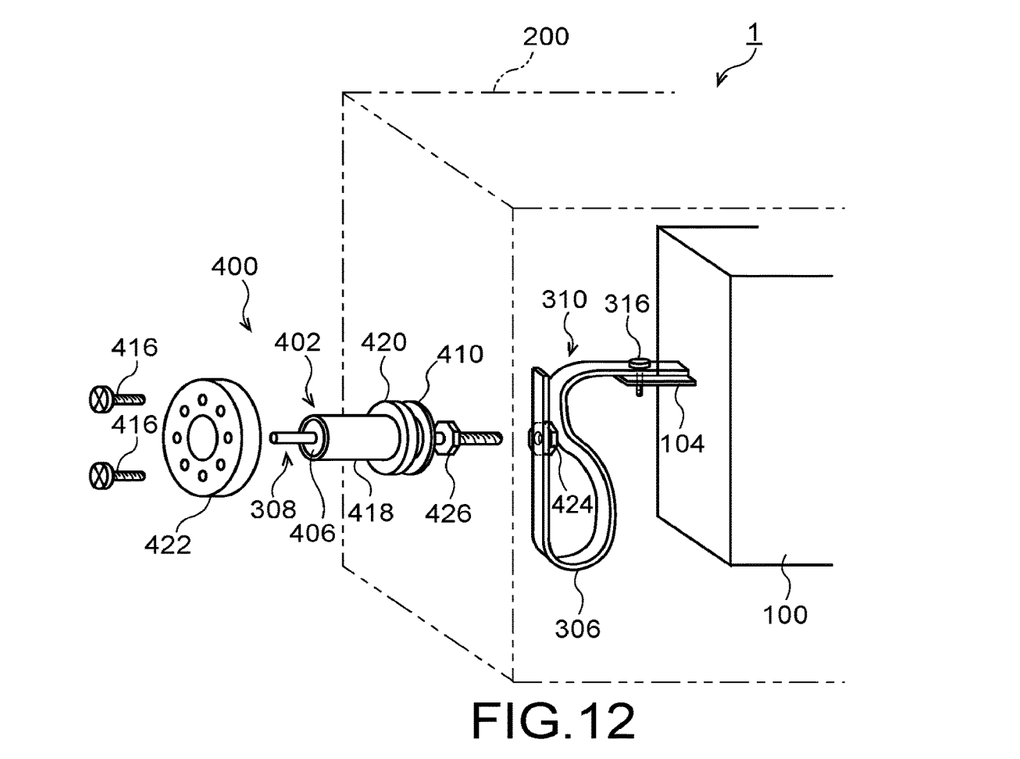
FIG. 12 is a diagram illustrating components of an electrically insulating member 400.

Based on FIG. 12, explanation will be made about an electrically insulating member 400 that is a first electrically insulating member 402 being a loose flange. FIG. 12 is a diagram illustrating components of the electrically insulating member 400.

As illustrated in FIG. 12, the electrically insulating member 400 includes the first electrically insulating member 402, a second electrically insulating member 406, a third electrically insulating member 410, a flange 422, a nut 424, and a nut 426. The outer bus bar 308 mentioned here is already fixed with a wedge. The electrically insulating member 400 illustrated in FIG. 12 differs from the electrically insulating member 400 illustrated in FIG. 8 in the third embodiment in that the electrically insulating member 400 includes the flange 422, the nut 424, and the nut 426. Points of difference will be explained below.

The first electrically insulating member 402 includes a column-like shape portion 418 and a disc 420 in which no threaded hole is provided. The flange 422 has a disc-like shape and includes a hole portion through which the column-like shape portion 418 in the first electrically insulating member 402 penetrates.

A joint portion between the outer bus bar 308 and the inner bus bar 310 includes the nut 424 and the nut 426. In other words, the joint portion mentioned here is double-nutted. In addition, the outer bus bar 308 is threaded for the nuts 424 and 426.

Figure 13:
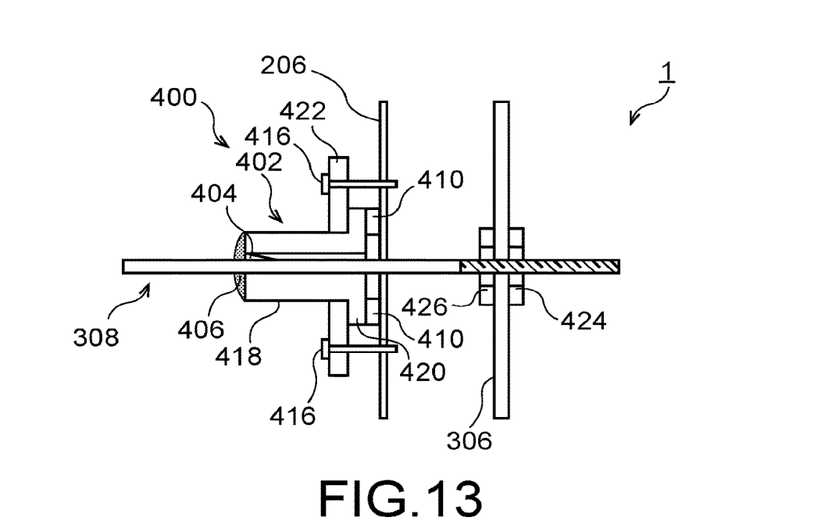
FIG. 13 is a cross-sectional schematic diagram of the components illustrated in FIG. 12 in an assembled state.

FIG. 13 is a cross-sectional schematic diagram of the components illustrated in FIG. 12 in an assembled state. Based on FIG. 13, explanation will be made about the electrically insulating member 400 in a state in which the components illustrated in FIG. 12 are assembled. As illustrated in FIG. 13, at the time when the components are assembled, the outer bus bar 308 and the inner bus bar 306 are screwed with the nuts 424 and 426. Subsequently, the flange 422 is screwed, with the column-like shape portion 418 made to penetrate through the hole portion of the flange 422. This causes the disc 420 of the first electrically insulating member 402 to be pressed by the package wall 206 and the flange 422, whereby the first electrically insulating member 402 is fixed to the package wall 206.

(Action)

While the screws of the flange 422 are loosened, the first electrically insulating member 402 can be rotatably supported. This makes the screwing of the outer bus bar 308 and the inner bus bar 306 with the nuts 424 and 426 free from the rotation of the outer bus bar 308. Therefore, the occurrence of a rotational strain between the outer bus bar 308 and the inner bus bar 306 is inhibited.

In the joint portion between the outer bus bar 308 and the inner bus bar 310, the double nuts 424 and 426 are used. With this configuration, the threading of the outer bus bar forms this joint portion.

(Effect)

In the fuel cell module 1 according to the sixth embodiment, the first electrically insulating member 402 is provided in the form of a loose flange. With this configuration, it is possible to rotate the outer bus bar 308 at the time when the outer bus bar 308 and the inner bus bar 306 are screwed, without performing plastic deformation of the outer bus bar. This reduces a rotational strain occurring at the time of joining the outer bus bar and the inner bus bar.

In addition, in the joint portion between outer bus bar 308 and the inner bus bar 310, the double nuts 424 and 426 are used. With this configuration, the threading of the outer bus bar can form this joint portion. Therefore, it is possible to join the outer bus bar 308 and the inner bus bar 310 at a cost lower than in the case of threading an internal thread on the outer bus bar 308.

The several embodiments of the present invention are explained above. However, the embodiments are presented as examples and are not intended to limit the scope of the invention. These new embodiments can be implemented in other various forms. Various omissions, substitutions, and changes can be made in a range not departing from the gist of the invention. These embodiments and modifications of the embodiments are included in the scope and the gist of the invention and included in the inventions described in claims and a scope of equivalents of the inventions.

The invention claimed is:

1. A fuel cell module comprising:
a cell stack configured to include a plurality of fuel cells that are stacked, the fuel cells being configured to generate electric power using an oxygen-containing gas and a hydrogen-containing gas;
a package configured to house the cell stack in a space surrounded by a package wall;
at least one bus bar configured to include one end electrically connected to an electrode terminal in the package of the cell stack, and include another end positioned outside the package through a through hole in the package wall, the at least one bus bar including a spring mechanism in the package, wherein an expanding direction of the spring mechanism is the same as a projecting direction of the bus bar; and
an electrically insulating member configured to enclose a gap between the bus bar and the package with the bus bar and the package electrically insulated from each other, and configured to fix the bus bar to the package wall, wherein the electrically insulating member comprises:
a first electrically insulating member including a guide hole portion therein through which the bus bar is inserted;
a wedge disposed in a gap between the guide hole portion of the first electrically insulating member and the bus bar; and
a second electrically insulating member configured to seal a gap between the first electrically insulating member and the bus bar.

2. The fuel cell module according to claim 1, wherein the spring mechanism has a restoring force generated by a metal elastic body.

3. The fuel cell module according to claim 2, wherein the spring mechanism is at least one of a helical spring and a metal elastic body having a U-like shape.

4. The fuel cell module according to claim 3, wherein the U-like shape is a U-like shape in which a gap in an opened portion is narrower than gaps of other portions.

5. The fuel cell module according to claim 1, wherein the bus bar is separable into two or more pieces, one of separated pieces of the bus bar includes an internal thread feature, and another one of the separated pieces of the bus bar includes an external thread feature.

6. The fuel cell module according to claim 5, wherein, of the pieces of the bus bar, an outer bus bar in a region that is in contact with the electrically insulating member differs in material from an inner bus bar in a region that is closer to the electrode terminal than the outer bus bar.

7. The fuel cell module according to claim 6, wherein a shape of at least a region in the outer bus bar that is in contact with the electrically insulating member is a column-like shape.

8. The fuel cell module according to claim 6, wherein the inner bus bar is plate-like and includes the spring mechanism.

9. The fuel cell module according to claim 1, wherein a number of the at least one bus bar is more than one, and one of the bus bars is connected to a voltage terminal that is provided on a stacking surface of the cell stack to measure voltage.

10. The fuel cell module according to claim 1, wherein a number of the at least one bus bar is more than one, and one of the bus bars is connected to a voltage terminal that is provided on a stacking surface of the cell stack to measure voltage, and including another end disposed outside the package, the one of the bus bars including a spring mechanism in the package.

* * * * *